United States Patent
Spamer et al.

(10) Patent No.: US 7,914,036 B2
(45) Date of Patent: Mar. 29, 2011

(54) VENT ASSEMBLY

(75) Inventors: Carl D. Spamer, Brighton, MI (US); Daniel F. Gillay, Plymouth, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 12/487,771

(22) Filed: Jun. 19, 2009

(65) Prior Publication Data

US 2010/0320734 A1 Dec. 23, 2010

(51) Int. Cl.
*B60R 21/16* (2006.01)
(52) U.S. Cl. .................................................... 280/728.2
(58) Field of Classification Search ............... 280/728.2, 280/730.2
See application file for complete search history.

(56) References Cited

U.S. PATENT DOCUMENTS

| | | | | |
|---|---|---|---|---|
| 7,762,574 B1* | 7/2010 | Spamer et al. | ............. | 280/728.2 |
| 2006/0220356 A1* | 10/2006 | Baekelandt | ................ | 280/730.2 |
| 2006/0290118 A1 | 12/2006 | Thomas | | |

* cited by examiner

*Primary Examiner* — Faye M. Fleming
(74) *Attorney, Agent, or Firm* — Gifford, Krass, Sprinkle, Anderson & Citkowski, P.C.

(57) ABSTRACT

The present invention discloses a retention apparatus for a fin subassembly used in connection with a vent assembly of a vehicle including a headliner assembly mounted to an interior vehicle body structure. A curtain side airbag is disposed between the headliner assembly and the vehicle body structure. The headliner is configured to be displaced by the curtain side airbag upon airbag deployment so as to provide a safety feature for passengers of the vehicle. The vent assembly includes a trim cover, a retainer ring and a fin subassembly. The trim cover is mounted to a vehicle headliner and the trim cover having a predetermined inside diameter. The fin subassembly having a plurality of fins configured to direct airflow from an air duct and also having an extended actuator operatively connected to the fins to permit simultaneous and identical movement of the fins. The fin subassembly is mounted in the retainer ring and the retainer ring is rotatably mounted in the trim cover to allow the retainer ring and fin subassembly to freely rotate. The extended actuator having a length greater than that of the predetermined inside diameter of the trim cover to prevent the fin subassembly from detaching from the vent assembly as a whole upon curtain side airbag deployment.

11 Claims, 3 Drawing Sheets

VENT ASSEMBLY

FIELD OF THE INVENTION

The present invention relates generally to a vent assembly for a vehicle, and in particular, to a vent assembly configured to remain attached to a vehicle headliner during curtain side airbag deployment.

BACKGROUND OF THE INVENTION

Curtain side airbag systems are commonly known and used. Curtain side airbags may be positioned in various locations within the passenger compartment of a vehicle. For instance it is known to place a curtain side airbag in the headliner of a vehicle so as to protect the head of the occupant during an accident. The curtain side airbag displaces a portion of the headliner or trim panel and deploys into the vehicle passenger area to protect the head of the passenger.

It is commonly known to mount trim components, such as a vent assembly, onto a trim panel, such as a headliner. A vent assembly typically consists of a trim component and a fin subassembly. The fin subassembly typically encompasses a plurality of fins and an actuator operatively configured to connect the plurality of fins. A vent assembly may remain in communication with an air duct. Such air ducts normally provide heated or cooled air from an HVAC unit located elsewhere in the vehicle. The vent assemblies are often fully adjustable allowing a passenger to freely manipulate the vent assembly. The vent assembles are normally able to rotate, open and close according to passenger preference.

However, the vent assembly can become detached from the headliner during curtain side airbag deployment. Oftentimes, only the fin subassembly becomes detached during curtain side airbag deployment. As the curtain side airbag quickly deploys and forces through the vehicle headliner, the vent assembly, or fin subassembly, can be forcibly detached from the headliner at a high rate of speed. The flying vent assembly poses serious safety risks to the vehicle passengers. Accordingly, it is known to tether the vent assembly to the vehicle body structure so as to retain the vent assembly to the trim panel or headliner. Essentially, the vent assembly is anchored to the vehicle body structure so as to prevent the vent assembly from disconnecting from the trim panel.

However, there are circumstances where simply tethering the vent assembly to the vehicle body structure will not prevent the entire vent assembly from detaching from the trim panel. It is common for vent assemblies to contain a fin subassembly comprised of a plurality of fins and an actuator. The fins direct the flow of air while the actuator allows for simultaneous movement of the plurality of fins. This fin subassembly often becomes forcibly detached from the vent assembly as a whole. If unsecured, the fin subassembly could become detached from the vent assembly during curtain side airbag deployment.

However, using a tether or cord to secure the fin subassembly is not always feasible. It is known in the art to allow a fin subassembly to rotate within its housing to allow a passenger to direct airflow according to his or her preference. If a cord or tether is attached to a fin subassembly, it may become tangled or twisted from passenger manipulation. Accordingly, the vent subassembly must be attached to the whole vent assembly and the trim panel or headliner by a manner other than a cord or tether.

Additionally, the implementation of a cord or tether to retain a fin subassembly, or vent assembly as a whole, would be required to attach to a vehicle body. A tether or cord would necessarily require a hole or gap in the air duct in order to reach the vehicle body. A compulsory hole or gap in the air duct reduces HVAC efficiency. Accordingly, the vent subassembly must be attached to the whole vent assembly and the headliner by a manner other than a cord or tether.

Accordingly, it is desirable to have a vent subassembly having a retainer apparatus mounted on the fin subassembly that retains the fin subassembly to a headliner during curtain side airbag deployment.

SUMMARY OF THE PRESENT INVENTION

The present invention provides a headliner assembly mounted to an interior vehicle body structure. A curtain side airbag disposed between the headliner assembly and the vehicle body structure. The headliner is configured to be displaced by the curtain side airbag upon airbag deployment so as to provide a safety feature for passengers of the vehicle. The vent assembly includes a trim cover, a retainer ring and a fin subassembly. The trim cover being mounted to a vehicle headliner and the trim cover having a predetermined inside diameter. The fin subassembly having a plurality of fins configured to direct airflow from an air duct and also having an extended actuator operatively connected to the fins to permit simultaneous and identical movement of the fins. The fin subassembly is mounted in the retainer ring and the retainer ring is rotatably mounted in the trim cover to allow the retainer ring and fin subassembly to freely rotate. The extended actuator having a length greater than that of the predetermined inside diameter of the trim cover to prevent the fin subassembly from detaching from the vent assembly as a whole upon curtain side airbag deployment.

DETAILED DESCRIPTION OF THE PRESENT INVENTION

The present invention discloses a retention apparatus for a fin subassembly used in connection with a vent assembly of a vehicle including a headliner assembly mounted to an interior vehicle body structure.

Figure 1:
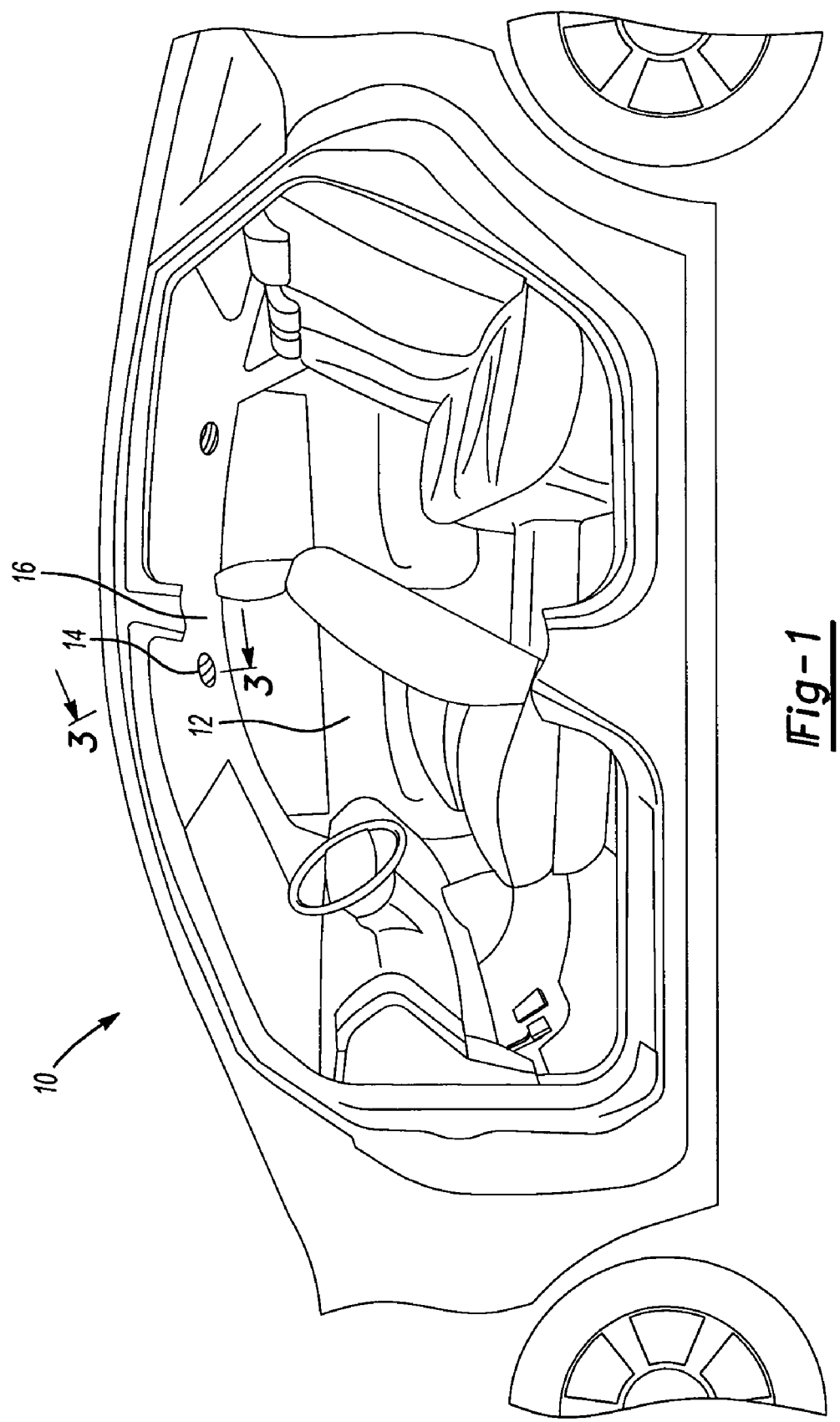
FIG. 1 is a side perspective view of a vehicle of the vent assembly apparatus mounted in the vehicle headliner.

FIG. 1 is a side perspective view of a vehicle of the vent assembly apparatus mounted in the vehicle headliner. For purposes of the present invention, a headliner is generally made of a composite material that consists of face fabric with foam backing that is adhered to the inside roof of automobiles. The automobile 10 of FIG. 1, for purposes of this invention, may be of the car, SUV, minivan, truck or van type. For purposes of this invention, the automobile 10 is not limited to the design as depicted in FIG. 1. The automobile 10 consists of a headliner generally located at 16 and extending over the roof of the automobile 10. The vent assembly 14 is generally located on the headliner 16 of the vehicle but may be positioned in other parts of the vehicle. A curtain side airbag (not pictured) is positioned generally behind the headliner 16 and the vent assembly 14. Upon deployment, the curtain side airbag enters the passenger compartment 12 of the automobile 10.

Figure 2:
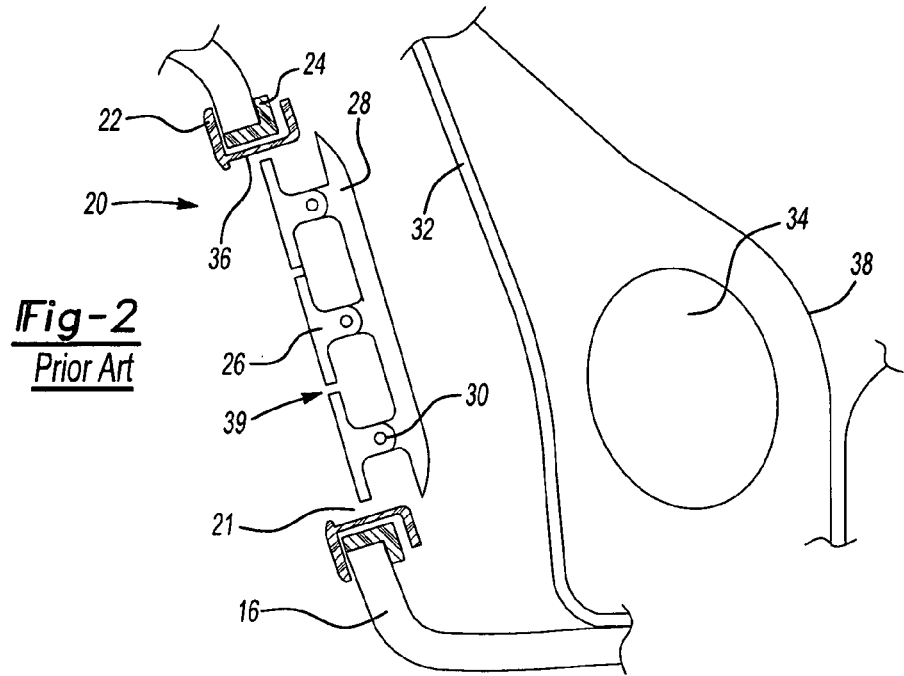
FIG. 2 is a side sectional view of a known design of a vent assembly.

FIG. 2 is a side sectional view of a known design of a vent assembly. The vent assembly 20 of the prior art is typically consists of a headliner 16, retainer ring 36, trim cover 22 and a fin subassembly 39. The fin subassembly 39 consists of a plurality of fins 26, plurality of connectors 30 and actuator 28. Actuator 28 operatively connects to the plurality of fins 26 by connector 30 to allow for simultaneous movement of the plurality of fins 26. This arrangement allows the passenger to simultaneously the control the plurality of fins 26 and direct airflow from an air duct 32.

The fin subassembly 39 is mounted in the retainer ring 36. The retainer ring 36 is then rotatably mounted in the trim cover 22. Such assembly allows a passenger to freely rotate the fin subassembly 20. The trim cover 22 and completed assembly of the vent assembly is then mounted onto the headliner 16 within the installing hole 21 to allow airflow from the duct 32. The duct 32 provides airflow from the HVAC unit (not pictured). A passenger is able to freely rotate, manipulate, open and close the vent assembly according to his or her preference.

The curtain side airbag 34 is mounted between the air duct 32 and the vehicle body 38. Upon deployment, the curtain side airbag 34 breaks though the air duct 32 and the headliner 16. The vent assembly 20 and the fin subassembly 39 frequently detach from the headliner 16 upon curtain side airbag deployment. The detachment of the vent assembly 20 creates numerous safely concerns. It is desirable to propose a solution to the above mentioned problem. The solution is discussed in great detail in the following paragraphs.

Figure 3:
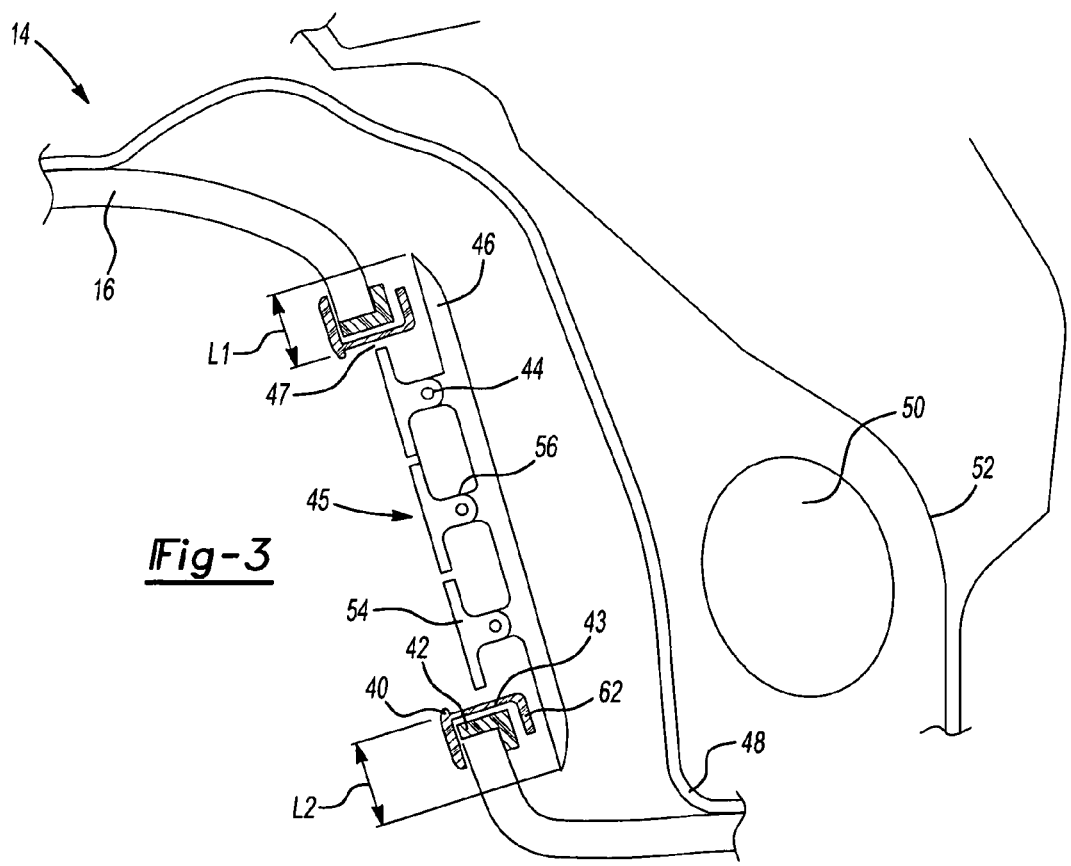
FIG. 3 is a side view showing an extended actuator along the line 3-3 in FIG. 1.

FIG. 3 is a side view showing an extended actuator along the line 3-3 in FIG. 1. The vent assembly 14 is preferably includes a headliner 16, retainer ring 43, trim covers 40, 42 and a fin subassembly 45. The fin subassembly 45 consists of a plurality of fins 54, plurality connectors 44 and extended actuator 46. Extended actuator 46 pivotally connects to the plurality of fins 54 by connectors 44 to allow for simultaneous movement of the plurality of fins 54. This arrangement allows the passenger to simultaneously the control the plurality of fins 54 and direct airflow from an air duct 48.

The fin subassembly 45 is mounted in the retainer ring 43. The retainer ring 43 is then rotatably mounted in the trim cover 40. Such assembly allows a passenger to freely rotate the fin subassembly 45. The trim cover 40 and completed assembly of the vent assembly are then mounted onto the headliner 16 within the installing hole 47 to allow airflow from the duct 48. The air duct 48 provides airflow from the HVAC unit (not pictured). A passenger is able to freely rotate, manipulate, open and close the vent assembly according to his or her preference.

The curtain side airbag 50 is mounted between the air duct 48 and the vehicle body 52. Upon deployment, the curtain side airbag 50 breaks though the air duct 48 and the headliner 16. The vent assembly 14 remains securely mounted to the headliner 16 and does not detach from the headliner 16. The extended actuator 46 prevents the fin subassembly 45 from detaching from the full vent assembly 14 or the headliner 16.

The trim cover 40 has an installing hole 47 which is configured to accept the retainer ring 43 and fin subassembly 45. The trim cover 40 has a predetermined diameter. Extended actuator 46 has a predetermined length. The length of the extended actuator 46 must be longer than the predetermined diameter of the trim cover 40. When the length of the extended actuator 46 is longer than the diameter of the trim cover 40, the vent fin subassembly 45 is prevented from detaching from the vent assembly 14.

The extended actuator 46 should be long enough as to have a length greater than predetermined diameter of the trim cover 40 regardless of whether the plurality of fins 54 are opened or closed. The extended actuator 46 should substantially overlap the rear trim cover 62. A large overlap increases the likelihood of the fin subassembly 45 staying attached to the vent assembly 14. This overlap is generally located at L1, L2.

Figure 4:
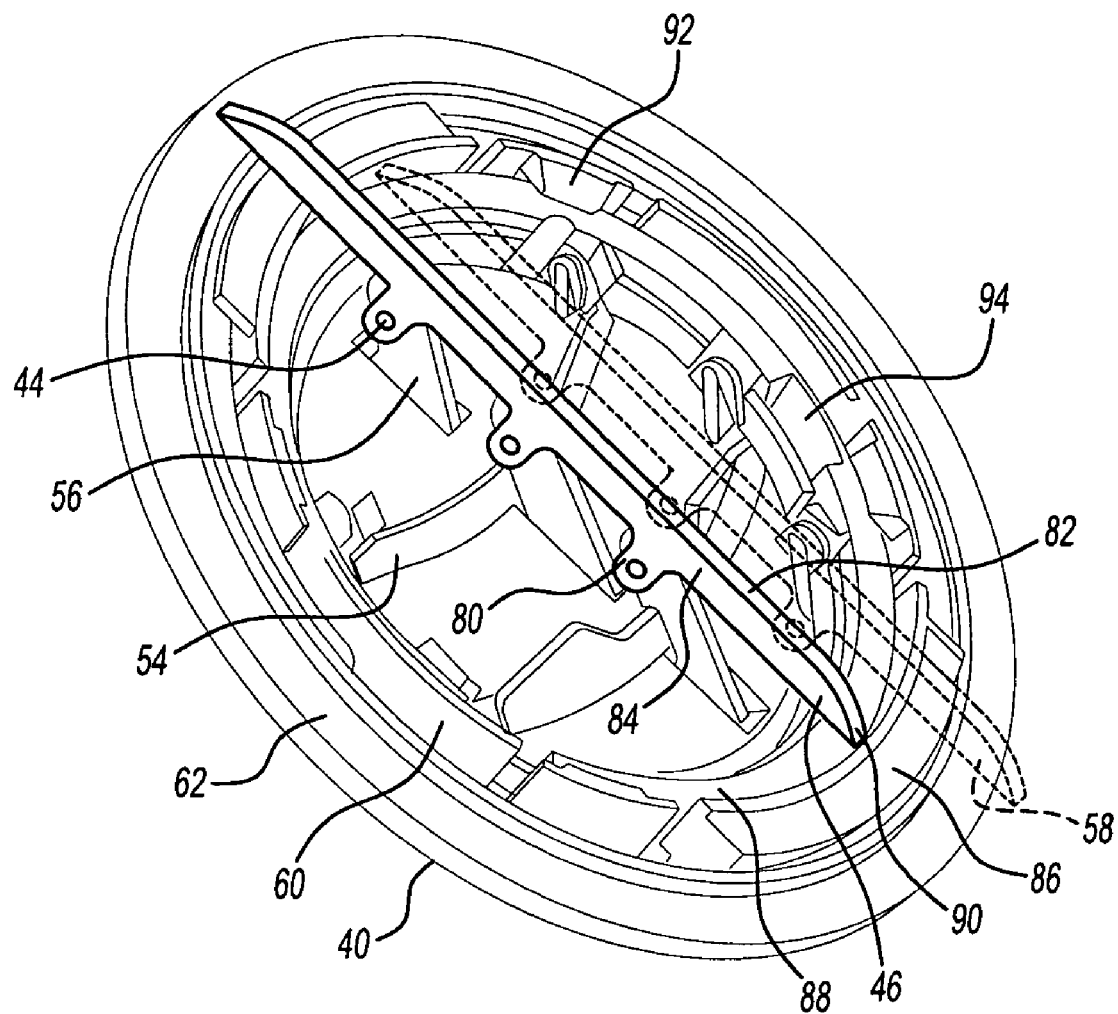
FIG. 4 is a perspective view of the rear of the vent assembly illustrating movement of the actuator.

The movement of the extended actuator 46 is shown in FIG. 4 generally at 58. FIG. 4 is a perspective view of the rear of the vent assembly illustrating movement of the actuator. FIG. 4 illustrates a plurality of fins 54, 56, plurality of connectors 44 and extended actuator 46. Extended actuator 46 pivotally connects to the plurality of fins 54 by connectors 44 to allow for simultaneous movement of the plurality of fins 54. The rear retainer ring 60, 86 is shown mounted into the rear trim cover 62. The rear of the retainer ring 60 may be comprised of different levels and grooves to improve installation and maneuverability. Retainer ring 60 is has a level generally located at 88. Retainer ring 60 may also have various clips or hooks 92 and slots 94.

Extended actuator 46 is provided with a plurality of lugs 88 and a plurality of connectors 44. The lugs 80 and connectors 44 connect to the plurality of fins 54 to allow for simultaneous movement. The extended actuator 46 has an end 90 which may be beveled to allow for increased maneuverability. The end 90 may also be flat, rounded or otherwise shaped. The extended actuator 46 is not limited to the generally rectangular shape 82, 84 as depicted in FIG. 4. It is widely possible for the extended actuator 46 to have a cylindrical or other general shape. The extended actuator 46 is not limited to the exact shape as depicted in FIG. 4.

In view of the teaching presented herein, it is to be understood that numerous modifications and variations of the embodiments disclosed will be readily apparent to those of skill in the art. Likewise, the exact shape, composition and the like of the vent assembly can be altered without extending beyond the scope of the invention. The foregoing is illustrative of specific embodiments of the invention, but is not meant to be a limitation upon the practice thereof. It is the following claims, including all equivalents, which define the scope of the invention.

We claim:

1. A vent assembly for use in a motor vehicle having a curtain side airbag, a headliner, an air duct and a passenger compartment, said vent assembly comprising:
    a trim cover mounted to said vehicle headliner and said trim cover having a predetermined inside diameter;
    a fin subassembly having a plurality of fins configured to direct air flow from an air duct and an actuator operatively connected to said fins;
    said actuator having a length greater than that of said inside diameter of said trim cover;
    whereby, said actuator extends to overlap said trim cover to prevent said fin subassembly from detaching from said vent assembly upon deployment of said curtain side airbag.

2. The vent assembly of claim 1 wherein said trim cover includes an installing hole configured to accept a retainer ring.

3. The vent assembly of claim 2 wherein said retainer ring is rotatably installed within said installing hole.

4. The vent assembly of claim 3 wherein said retainer ring is configured to accept said fin subassembly.

5. The vent assembly of claim 4 wherein said fin subassembly and said retainer ring are free to rotate within said installing hole of said trim cover.

6. The vent assembly of claim 1 wherein said length of actuator is at least greater than said inside diameter of said trim cover.

7. The vent assembly of claim 6 wherein said actuator pivotally connects to said plurality of fins.

8. The vent assembly of claim 7 wherein said fin subassembly is operatively configured to open allow for air flow to the passenger compartment.

9. The vent assembly of claim 7 wherein said fin subassembly is operatively configured to close to prevent air flow to the passenger compartment.

10. The vent assembly of claim 1 wherein said vent assembly is comprised of one or more resilient materials.

11. A vent assembly for use in a motor vehicle, said vent assembly comprising:
- a vehicle body;
- a headliner;
- a curtain side airbag disposed between said headliner and said vehicle body and said curtain side airbag configured to instantaneously inflate upon collision intended to protect a vehicle passenger;
- a trim cover mounted to said headliner and said trim cover including an installing hole having a predetermined inside diameter;
- a retainer ring rotatably installed within said installing hole;
- a fin subassembly having a plurality of fins configured to direct air flow from an air duct;
- said fin subassembly further having an actuator operatively connected to said fins to permit simultaneous and identical movement of said fins;
- said actuator having a length greater than that of said inside diameter of said trim cover and where said actuator pivotally connects to said plurality of fins allowing said plurality of fins to open and close;
- whereby, said fin subassembly is mounted within said retainer ring and said fin subassembly and said retainer ring are free to rotate within said installing hole of said trim cover;
- whereby, upon instantaneous inflation of said curtain side airbag said curtain side airbag forcibly ruptures said headliner and enters a passenger compartment; and,
- whereby, said actuator extends to overlap said trim cover to prevent said fin subassembly from detaching from said vent assembly upon instantaneous inflation of said curtain side airbag.

* * * * *